Figure 1:
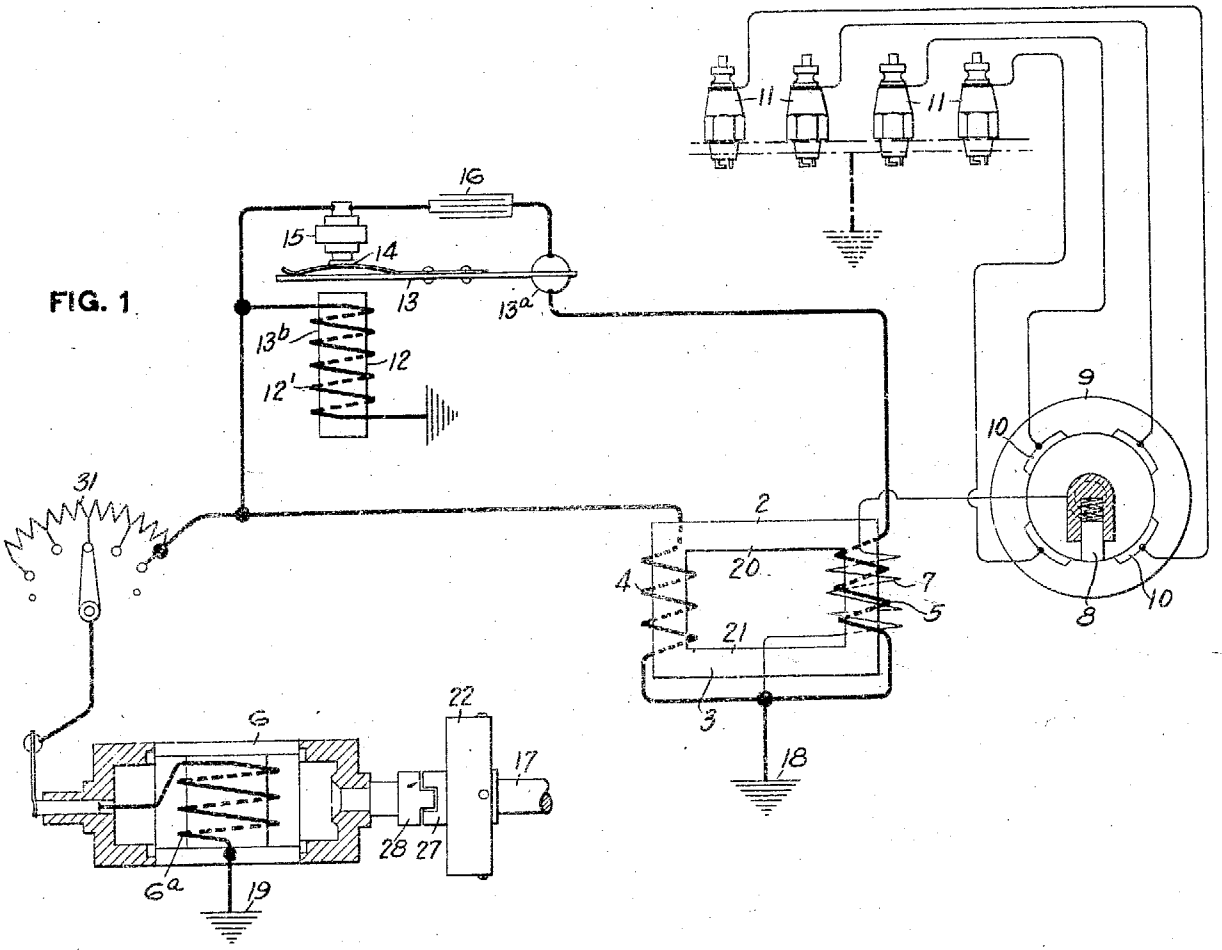

R. VARLEY.

ELECTRICAL SYSTEM.

APPLICATION FILED MAY 16, 1916.

Reissued Oct. 31, 1916.

14,208.

4 SHEETS—SHEET 1.

INVENTOR

Richard Varley by his Arthur Keller

Atty. Attorney

R. VARLEY.
ELECTRICAL SYSTEM.
APPLICATION FILED MAY 16, 1916.
Reissued Oct. 31, 1916.
14,208.
4 SHEETS—SHEET 2.
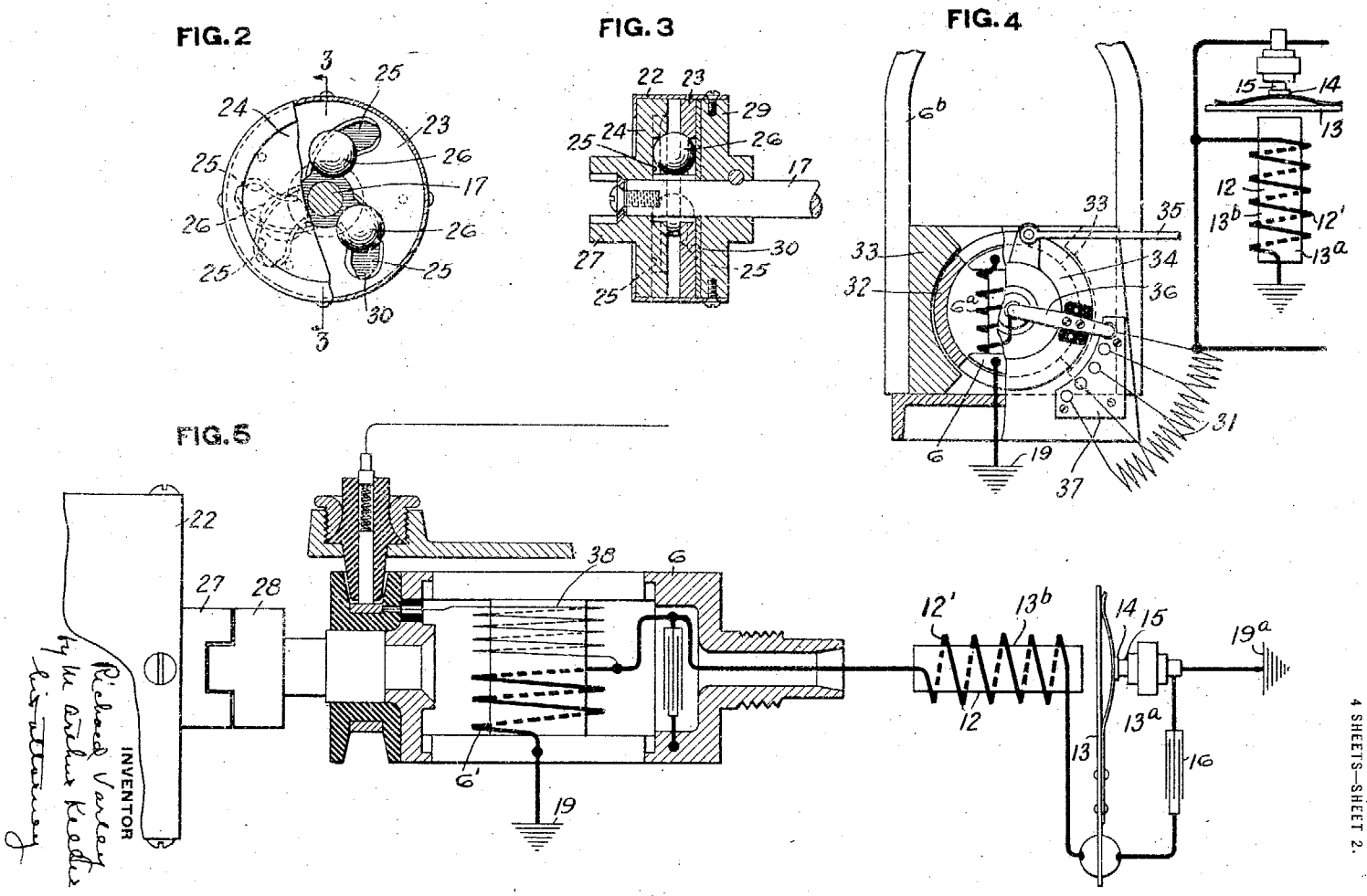
INVENTOR
Richard Varley
by Mr Arthur Keeler
his attorney

R. VARLEY.

ELECTRICAL SYSTEM.

APPLICATION FILED MAY 16, 1916.

Reissued Oct. 31, 1916.

14,208.

4 SHEETS—SHEET 3.

INVENTOR

Richard Varley by M. Arthur Keller his attorney

R. VARLEY.
ELECTRICAL SYSTEM.
APPLICATION FILED MAY 16, 1916.
Reissued Oct. 31, 1916.
14,208.
4 SHEETS—SHEET 4.
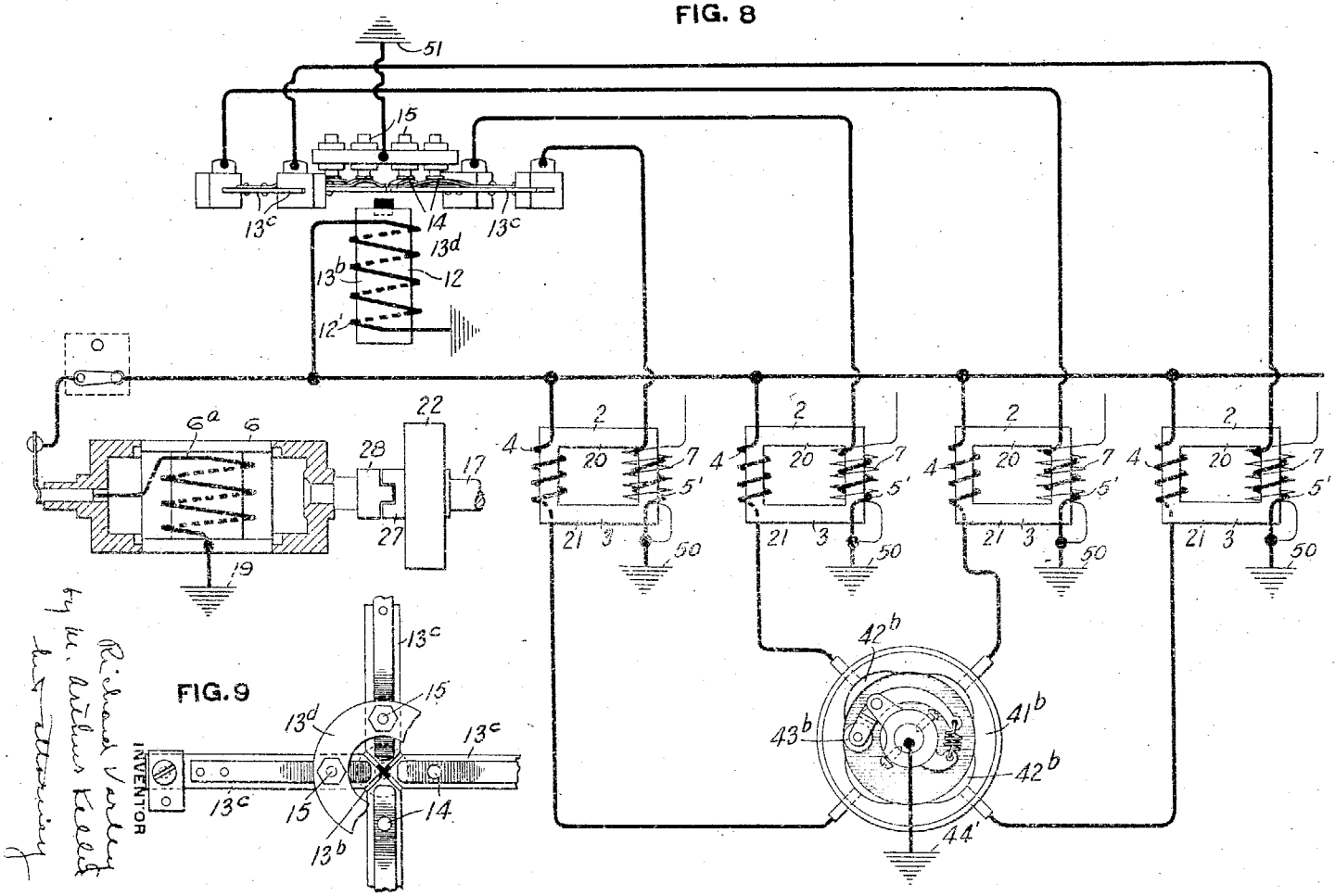
INVENTOR
Richard Varley
by M. Arthur Kellett
his attorney

UNITED STATES PATENT OFFICE.

RICHARD VARLEY, OF ENGLEWOOD, NEW JERSEY.

ELECTRICAL SYSTEM.

14,208. Specification of Reissued Letters Patent. Reissued Oct. 31, 1916.

Original No. 1,175,668, dated March 14, 1916, Serial No. 873,291, filed November 21, 1914. Application for reissue filed May 16, 1916. Serial No. 97,983.

*To all whom it may concern:*

Be it known that I, RICHARD VARLEY, a citizen of the United States of America, residing at Englewood, in the county of Bergen and State of New Jersey, have invented new and useful Improvements in Electrical Systems, of which the following is a full, clear, and exact description, reference being had to the accompanying drawings, which form part of this specification.

This invention is an electrical system. While not limited to a specification of use, it finds advantageous embodiment in means for exploding the charges in the cylinders of an internal combustion engine, particularly such as are used on autovehicles.

An object of the invention is to provide a system of the character indicated, in which a primary circuit is periodically interrupted or opened and closed by means of current actuated contact mechanism. A suitable source of current is employed, such as a magneto electric machine which delivers an impulsive or alternating current the tension curve of which shows the usual positive and negative characteristics. This current is caused to traverse the winding of the magnetic device which is thereby rendered intermittently operatively responsive, at a predetermined current value, to interrupt (or if desired, to close) the primary circuit. In an ignition circuit energized by alternating current, it is desirable to interrupt, or close, the circuit at or near the peak of the current wave in order to obtain an efficient spark at the plug. I therefore employ a magnetic device responsive to interrupt the primary circuit at or near the current wave peak. This magnetic device may be connected in circuit with the source of ignition current or may be actuated by a separate source of current having suitably timed or intermittently delivered current values for operatively energizing said device.

Another object is to provide an ignition system in which spark adjustment may obtain through regulation of the current or generator phases; and in which this control may be automatically effected.

The above and other objects are provided for by the system and apparatus which I shall now describe, in connection with the accompanying drawings, so that others skilled in the art may understand and construct the same, it being premised, however, that many changes may be made in the circuit arrangements and constructions shown without departing from my invention.

Figures 6, 7:
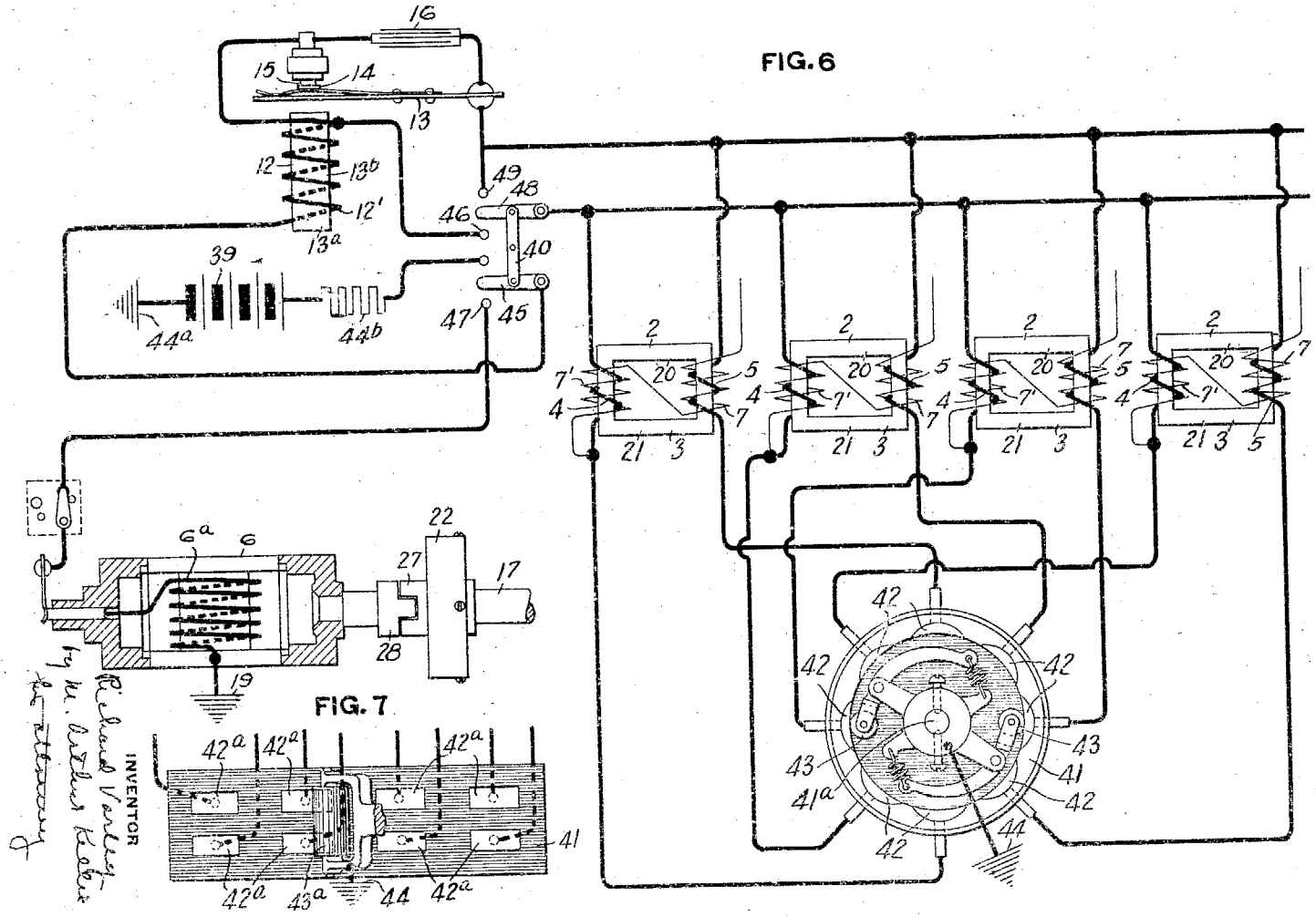

Figure 1 is a diagrammatic view of an ignition system embodying my invention; Fig. 2 is an elevational view, partly broken away, of a centrifugally actuated device for adjustably advancing or retarding in its magnetic field the generator armature, indicated in Fig. 1; Fig. 3 is a sectional view of said centrifugal device, taken on the line 3—3 of Fig. 2; Fig. 4 is an end elevational view of a magneto generator, partly broken away and diagrammatically illustrated, and part of the circuits and interrupter device of the arrangement of Fig. 1, showing the magneto having oscillating pole members, and a resistance or rheostat operatively associated with said oscillating member; Fig. 5 is a diagrammatic view of the generative and inductive windings of a high tension magneto generator involved in a system embodying my invention; Fig. 6 is a diagrammatic view of a system similar to that disclosed in Fig. 1, but showing a plurality of transformers and also connections for energizing the transformers from a source of direct current such as an ordinary battery or an accumulator; Fig. 7 is a diagrammatical extension of a modified form of controller or roller timer which may be employed in connection with the system shown in Fig. 6; Fig. 8 is a diagrammatic view of a modified system, similar to that disclosed in Fig. 6, but showing the transformers provided with choke coils commonly controlled by interrupter mechanism, as hereinafter more fully set forth; and Fig. 9 is a fragmentary top plan view of the interrupter mechanism indicated in Fig. 8.

In Fig. 1 the numeral 2 indicates a spark coil or transformer corresponding to that disclosed in Letters Patent No. 1,103,385, granted to me July 14th, 1914, in that there is employed a core 3 which is energized by means of windings 4 and 5 arranged to be connected to a suitable source of current, such as a magneto generator, the armature 6 of which is illustratively sufficient for the purpose of this description. A secondary winding or coil 7, inductively related to the transformer core, or the coils 4 and 5, is grounded at one end and leads at the other end to the arm 8 of suitable properly synchronously driven distributer apparatus 9.

the segments 10 of which connect with spark plugs 11 in the usual manner. Connected in shunt to or across the terminals of the generator winding 6[a] is an electromagnet 12 in attractive juxtaposition to which is a blade armature 13 carrying a contact 14 forming part of interrupter mechanism 13[a] for controlling the circuit of transformer winding 5, the fixed contact of said interrupter being indicated by the numeral 15, while connected across the contacts may be the usual condenser 16.

The magneto armature 6 is driven by the engine (not shown) by means of a shaft 17, so as to energize the coils or windings 4 and 5 of the transformer. Both windings are grounded, as at 18, to bring them in circuit with the generator ground 19. Therefore, energizing of the windings by the generator induces a magnetic flux in the transformer core, which seeks the normal magnetic path provided by the core. The turns of winding of these coils are unidirectionally wound or so connected with the source that the lines of force set up respectively by those two coils tend to meet one another in opposition at an intermediate point in the core, causing them to take an abnormal path or be diverted into a leakage path across the air gap or space intermediate the sides of the transformer. The result is the building up of magnetic energy in the core preparatory to interruption or opening of the circuit of the coil 5, restoration to normal path of travel of the body of flux in the core, maintained by the active source through winding 4, and induction of a high potential current in the secondary windings 7 for the production of a spark at the respective plug connected through the distributer arm 8, all as clearly set forth in Patent No. 1,112,177, granted to me September 29, 1914.

For reasons well understood, it is desirable that the circuit of the coil 5 be interrupted at a point when the alternating current traversing it and the coil 4 is at or near its maximum period or peak of flow. This is brought about by the interrupter mechanism shown, in which the armature 13 is responsively attracted by the magnetic core 13[b] energized by the winding 12[a]. The arrangement is such that the interrupter armature 13 is only attracted at or near the peak of the wave. Therefore the contacts 14 and 15 will be suddenly separated at a point of high current value, with resultant opening of the circuit of the transformer winding 5, violent change of flux in the transformer core and induction of a spark producing current, as stated.

To permit of maintenance of the moment of ignition, it follows that the period of separation of the interrupter contacts must be advanced or retarded, relatively to the engine crank shaft (not shown). With the armature 13 responsive to a magnetic pull produced by a predetermined current value or period of flow or peak of the tension wave of the current, it also follows that said peak must be advanced or retarded to vary the time of attraction of the interrupter armature. This may be brought about by adjustably shifting the magnetic poles of the generator armature, either by rotatively shifting the armature of the generator in the magnetic field, or by shifting the magnetic field relatively to the rotating armature. This latter may obtain in the employment of a generator in which the field structure may be rocked to vary the field or in which there is employed an intermediate shell or casing encircling and arranged to be oscillated about the armature. I may also employ a variable resistance connected in circuit with the interrupter winding for the purpose of variably lagging the current phases and thereby varying the time of operation of the interrupter to obtain spark adjustment. This latter feature may be combined with an adjustable armature or an oscillating field piece, whereby said resistance and adjustable member may operate in combination to obtain flexible control of the interrupter.

The arrangement shown in Fig. 1 provides means for effecting the above objects. The magneto generator armature 6 is driven by the shaft 17 through the medium of a centrifugally actuable variable coupling 22. This coupling is more clearly shown in Figs. 2 and 3, and comprises a plurality of disks 23 and 24 formed in the opposing faces of each of which are a plurality of arcuate grooves 25, the grooves in one disk extending in the opposite direction to and intersecting those in the other disk. Lodged in the grooves, between the disks, are ball weights 26 that, by reason of their engagement with the grooves in each disk, determine the point of intersection of the grooves. As a result, when the shaft 17 drives the coupling 22 at a high speed incident to developed propulsion of the engine, the ball members 26 will be centrifugally radially extended or thrown outwardly, thus varying the point of intersection of the grooves, and rotating the disk 24 relatively to the disk 23, in the direction of rotation of the shaft or armature. The disk 24, by reason of the interlocking clutch members 27 and 28, is connected to the armature 6, while the disk 23 is fixed to a head 29 that is driven by the shaft 17; a suitable fiber disk or pad 30, such as felt, being interposed between the disk 23 and head 29 to prevent vibratory chattering of the balls. It thus will be seen that as the speed of the engine builds up, the armature 6 and coupling 22 will be driven at a correspondingly advanced speed with the result that through centrifugal action of the coupling 22 the armature 6 will be advanced relatively to its driving member 17, in the magnetic field of the generator. The point of time of maximum period of flow of the current is therefore advanced to an angle the degree of which accords with the desired moment of separation of the interrupter contacts; the progress of angular adjustment being dependent upon the curve characteristics of the ball grooves 25 of the centrifugal coupling. Furthermore, inasmuch as the magnetic field is known to shift under high peripheral velocity of the armature, in the direction of armature rotation, so that the current taken from the magneto is delayed in phase, I preferably so determine the characteristics of the ball grooves of the coupling 22 as to cause that member to properly respond as the speed develops, for shifting of the armature to a compensative position in its magnetic field so as to preserve a current peak capable of producing an effective spark. However, it will be apparent that the magnetic field of the generator may shift to a position compensative movement of the armature to overcome which would extend over an angular degree greater than the range within which spark adjustment is desirable or possible. The necessity then is of a differential adjustment of the armature or generator phases and the time of interruption of the ignition circuit, so that should there obtain a disproportionate range of adjustment between the adjustable generator member and interrupter, substantial coincident will nevertheless obtain between the current peak and desired time of interruption of the transformer circuit. This may be effected by employing a variable resistance or rheostat 31 (see Fig. 1) by means of which I am able to lag the current behind the impressed voltage of the armature. Thus, if the armature is, by means of the centrifugal member 22, advanced say 15 degrees and it is desired that the spark be advanced at the same time to a position equal to 12 degrees of angular adjustment, by manipulating the rheostat 31 the current will encounter sufficient resistance or impedance productive of a three degree lag.

The employment of the variable resistance in connection with a generator having an adjustable field provides a flexibility in control not obtainable, of course, singly with either element. However, I do not desire to limit my invention to a system employing said element. Where it is desired to use such a resistance, it may be so associated with the generator adjusting member that movement of one will actuate the other. Such an arrangement is shown in Fig. 4 wherein the magneto generator 6[b] is shown as having oscillating pole members 32 disposed between the poles 33 and the armature 6. Rocking of the pole pieces 32 relatively to the poles and the armature, in lieu of advancing the armature, as described above, to vary the position of the magnetic field, may be effected in any suitable manner, as by means of an end plate 34, to which the members 33 are connected, and a link arrangement 35. Connected to and insulated from this rotatable member 34 is the rheostat arm 36 which connects with one end of the armature winding 6[a], grounded at 19. The rheostat contacts are concentrically arranged on a suitable insulating base 37. Thus upon rocking of the pole members 32 to effect shiftable adjustment of the magnetic field of the generator, the rheostat arm 36 will cut in and out the resistance coils, as is well understood.

From the foregoing description it will be seen that the magneto generator has been of a type adapted to supply current to an extraneous transformer or spark coil.

In Fig. 5 I have shown my invention embodied in the regular type of high tension magneto generator, in so far as concerns the inductive relationship of the primary and secondary windings. The armature 6 is preferably driven by means of the centrifugal adjusting member 22, described above, to obtain spark adjustment. The usual secondary winding 38 is shown as carried by the armature which also contains the primary winding 6′, controlling which, instead of the usual interrupter mechanism positively driven from the armature 6, is the current responsive interrupter 13[a], the armature 13 of which is attracted by the core 13[b] for separation of the contacts 14 and 15 for opening of the circuit, when the current traversing said circuit and the magnet winding 12′ approaches or reaches its maximum value; interruption of the circuit of the winding 6′ otherwise completed through grounds 19 and 19[a], resulting in induction of a high potential current in the secondary winding 38 which connects with the usual spark plug distributer. Adjustable control of this armature 6 by the centrifugal coupling 22, or control of its inductive phases, as by means of an adjustable field piece, for advancing or retarding the wave peak, resultantly advances or retards the time of separation of the interrupter contacts, all as hereinbefore fully set forth.

In Fig. 6 I show a system corresponding functionally with that disclosed in Fig. 1 with the exception that a plurality of transformer units are employed and means provided for energizing the transformers from a source of direct or continuous current such as a battery 39. Parts and circuits heretofore described, in this view bear like reference numerals and a repetition of description thereof is therefore unnecessary. The arrangement is such that the current responsive interrupter 13ᵃ is connected in active circuit with the transformer windings 4 and 5 during utilization of the battery or continuous current. When the transformer windings are energized from the source of alternating current the current responsive interrupter interrupts the circuit of one of the windings at or near the maximum peak or period of flow of the current wave, as above described in connection with Fig. 1. A double arm switch 40 is employed to alternately connect the windings with the source of alternating current and the battery 39. A duplex roller timer 41 which, by means of the fact that it employs eight circumferentially disposed contact segments 42 in alinement with one another, is for a four cycle four cylinder engine, driven by a time shaft 41ᵃ running at one-quarter engine speed instead of at the usual one-half time speed incident to employment of a regular four segment controller. The segments are so arranged that both windings of a transformer are brought into circuit with the source of energy, through the yieldable roller contacts or arms 43 and ground 44, as hereinafter more fully set forth.

Arm 45 of the switch 40 connects with one end of the interrupter winding 12′. The opposite end of said winding leads to fixed contact 15 and to contact button 46 of the switch. When the switch is shifted to bring arm 45 in contact with switch button 47, the interrupter winding 12′ is connected to the generator winding 6ᵃ. Movement of the roller timer arms to a set of transformer segments 42 will complete the generator circuit through respective transformer windings 4 and 5. That is, current flow from the generator will be through switch arm 45 and vibrator winding, thence in parallel through switch arm 48 and the interrupter mechanism and transformer windings 4 and 5 to roller timer ground 44, back to the generator through ground 19.

When the double arm switch is shifted to bring arm 45 into circuit with battery 39, and arm 48 in contact with switch button 49, connections are made for energizing the transformers from a source of direct or continuous current, as the battery 39, when the generator is not delivering an effective alternating current or when it is desired to run on battery ignition. With the switch arms occupying the position for such battery connection, the interrupter mechanism 13ᵃ is brought into circuit with both windings 4 and 5 of the respective transformer, and when the roller timer contacts or arms 43 connect with the segments 42 of said particular transformer, the battery current sets up a magnetic flux in the core 6 of the transformer, which flux is trembled or intermittently disturbed by the action of the current responsive interrupter which in such connection acts as a vibrator, thus inducing a high potential current in the secondary winding or coils 7 and 7′, for energizing of the spark plugs; the battery being grounded, as at 44ᵃ, in circuit with ground 11 of the roller contact arms 43. It thus will be seen that the current responsive interrupter acts as a vibrator for the circuits of both coils 4 and 5, interinductively associated with which are the secondary coils.

Where the system of Fig. 6 is employed in connection with a source of alternating current, the gage or size of the turns of the windings 4 and 5 of the transformer would be preferably such as to prevent no impeditive resistance thereby to flow therethrough of the alternating current. The result is that such windings would not present a desired resistance to the direct or continuous current of the battery. For that reason I may insert a resistance 44ᵇ in the circuit of the battery at a point between it and the double arm switch to overcome any dissipating action on the battery, incident to said capacity effect of the transformer windings.

Instead of employing a double arm roller timer having eight alining circumferentially disposed segments, I may use a roller timer in which are arranged two banks of four segments each. Such an arrangement is shown in Fig. 7 wherein the segments 42ᵃ are diagrammatically extended for clearness. These segments are arranged in pairs, one segment of which is above the other and each segment connected with a winding 4 or 5 of a transformer. The movable contact arm 43ᵃ of the roller timer, is arranged to bridge, in its rotatory travel the pair of segments. This arm may therefore be driven by the usual one-half speed timer shaft.

The system described in connection with Fig. 6 shows a transformer in which the windings 4 and 5 are both energizing windings. It will be apparent that my invention may find embodiment in a system in which one of these windings may act simply as a choke coil, not being adapted for connection with the source of energy. In that respect the invention may follow the disclosure of my Patent No. 1,081,413, granted to me December 16th, 1913. Such an arrangement is shown in Fig. 8 wherein the system employs a plurality of transformers the circuit of the primary windings 5′ of each of which is normally closed by interrupter mechanism 13ᵈ, through ground connections 50 and 51. The remaining parts of the system accord functionally with that of the disclosure of Fig. 6 in that the active windings 4 of the transformers may be intermittently brought into circuit with the generator winding by means of a four segment roller timer 41ᵇ grounded, as at 44′ in circuit with the generator ground 19, and the electromagnet 12 is connected across the generative winding of the magneto armature 6 which is capable of adjustment for obtaining spark advance and retard, as described. Of course it will be understood that I may employ a generator of the type disclosed in Fig. 4, and may also connect a rheostat in the circuit of the electromagnet, as set forth in connection with Fig. 1.

The interrupter mechanism $13^d$ comprises a plurality of armature blades $13^e$ insulated from one another and commonly associated with and insulated from the core $13^b$ of the electromagnet. When the roller timer arm $43^b$ connects with a segment $42^b$ the winding 4 of the respective transformer will be brought in energizing circuit through grounds 44′ and 19 with the generator, setting up a flux which, in seeking the normal magnetic path of the core, is restrained from traversing the core leg carrying the choke coil 5′, by reason of the normal circuit closure of said choke coil, so that the flux is caused to take a leakage path at an intermediate point in the core, as set forth and as clearly disclosed in said Letters Patent 1,081,413. When the current traversing the winding of the electromagnet approaches or assumes the peak of the wave, the armature blades $13^e$ will be suddenly attracted, causing separation or opening of the interrupter contacts 14 and 15 and resultant interruption of the circuit of the choke coil 5′. Opening of the choke coil causes a restoration of the flux, also actively maintained by the winding 4, to normal path or travel, a violent surge of flux through the leg carrying the choke coil and induction of a high potential current in the secondary coil or winding 7 of the particular transformer connected in active circuit through the controller.

The armature blades of the interrupter are insulated from one another so as to prevent short circuiting of one choke coil through another choke coil. Any suitable form of construction may be employed, but the arrangement shown is an advantageous one because it permits of employment of a single electromagnet; the armature blades $13^e$ being arranged so that their terminals lie in attractive juxtaposition to the core, as clearly shown in Figs. 8 and 9, while the fixed contacts 15 are carried by a common support grounded, as at 51.

The broad idea of employing a transformer system in which the magnetic flux is built up to a supernormal state, is not claimed herein as the same forms subject matter of my above mentioned Letters Patent 1,081,413.

The feature of connecting both primary windings of the transformer to a source of energy and interrupting either one or both of the circuits thereof, is not claimed herein as the same forms subject matter of my above mentioned Letters Patent 1,103,385, and also, the feature of controlling both primary circuits by means of a current responsive interrupter or vibrator, forms subject matter of my above mentioned Letters Patent 1,112,177, and is not therefore claimed herein.

The system generally disclosed in Figs. 6 and 8 of the accompanying drawings, forms subject matter of my application Serial No. 24,252, filed April 27, 1915, and is therefore not claimed herein.

Having thus described my invention, what I claim and desire to secure by Letters Patent is:

1. In an electrical system of the character described, an alternating current generator having a generative winding, a circuit energized thereby and including interrupter contacts, an electro-magnet for actuating the contacts, connected in shunt across said winding of the generator, a high tension winding inductively related to said circuit, and sparking means in circuit with said high tension winding.

2. A generator having a winding, a circuit energized thereby and including interrupter contacts, an electromagnet for actuating said contacts, an actuating winding for said magnet, traversed by current of intermittent high tension values, a winding inductively related to said circuit, and means for varying the time of assumption of said high tension values of the current traversing the magnet winding, for varying the time of operation of said interrupter means.

3. A generator having a winding, a circuit energized thereby and including interrupter contacts, a magnet for actuating said contacts, an actuating winding for said magnet, traversed by current of intermittent high tension values, a winding inductively related to said circuit, and automatically operative means for varying the time of assumption of said high tension values of the current traversing the magnet winding, for varying the time of operation of said interrupter means.

4. A generator having a winding, a circuit energized thereby and including interrupter contacts, a magnet for actuating said contacts, an actuating winding for said magnet, traversed by current of intermittent high tension values, a winding inductively related to said circuit, and a centrifugally actuable device for varying the time of assumption of said high tension values of the current traversing the magnet winding, for varying the time of operation of said interrupter means.

5. In an electrical system of the character described, an alternating current generator, a transformer having a primary winding in a generator circuit including interrupter contacts, an electromagnet for actuating said contacts, energized by the generator and operatively responsive to the maximum periods of flow of the alternating current, means for automatically varying the phase of the current actuating said electromagnet, and a sparking device energized by said transformer.

6. An alternating current generator adjustable for regulation of the generator phases, transforming means adapted to be energized thereby including a circuit, a current responsive controller for said circuit, adapted to operatively respond at or near the peak of the current wave, and a resistance in circuit with the generator and controller.

7. An alternating current generator, adjustable for regulation of the generator phases, transforming means adapted to be energized thereby, including a circuit, a current responsive controller for said circuit, adapted to operatively respond at or near the peak of the current wave, and a variable resistance in circuit with the generator and controller.

In testimony whereof I have hereunto set my hand.

RICHARD VARLEY.